Patented Jan. 11, 1944

2,338,799

UNITED STATES PATENT OFFICE 2,338,799

METHOD FOR SELECTIVELY PLUGGING WATER SANDS

Stuart E. Buckley and Gilbert G. Wrightsman, Houston, Tex., assignors to Standard Oil Development Company, a corporation of Delaware No Drawing. Application March 20, 1943, Serial No. 479,880

1 Claim. (Cl. 166—22)

The present invention is directed to a method for selectively plugging formations traversed by a borehole and producing different fluids such as oil and water.

It has already been proposed to achieve effective plugging of oil and water producing formations by injecting into the formations a liquid capable of being converted into a solid resin by the influence of elevated temperature over a period of time, the nature of the liquid being such that the resin produced is water-insoluble and oil-soluble. In the preferred embodiment of this method, the liquid used for injection is an intermediate condensation product of an oily nature resulting from the condensation of organic compounds capable of condensing into solid water-insoluble, oil-soluble resins. This oily product is readily pumpable. This method of working offers considerable advantages over previously known methods such as the injection of liquids capable of a reaction to produce a precipitate.

The present invention is based on the discovery that this new type of plugging can be further improved by carrying it out in stages as follows:

1. A first charge is injected into the formations and held in place sufficiently long to permit it to harden, after which the well is produced for a period of time sufficient for the removal of any of the resin which has become contaminated with oil.

2. A second charge is then injected into the formations and held in place sufficiently long to permit it to harden. Thereafter the well is placed on production.

This sequence of steps is based on the finding that where a water producing sand has previously been producing oil, there will be residual oil in the sand which will contaminate the resin injected into the formation and prevent it from hardening. When this formation is permitted to produce after the first hardening, the contaminated resin is forced out together with the oil contaminating it, with the result that the portion of the formation which it occupied is then wet by water. When the next charge is then injected, it will not be contaminated with oil and will harden satisfactorily, forming an effective seal.

As has previously been indicated, the liquid introduced is an oily intermediate condensation product of certain organic compounds. It is well known in the art that oil-soluble, water-insoluble resins may be produced from different classes of organic compounds. For example, alkylated phenols such as P-tertiary amyl phenol will condense with formaldehyde to produce such a resin, the reaction being catalyzed by acids, alkalies, or acid or alkaline salts. Another class of resins of this type is produced by modifying resins of the alkyd type by introducing into the reaction four or more molecules of drying oil (linseed or tung oil) for each molecule of glycerol or phthalic anhydride. Other oil-soluble resins such as certain vinyl resins, modified urea aldehyde resins, certain styrene resins and the like, well known in the art, may be utilized.

It may be mentioned here that while cresols and unsubstituted phenols do not per se form satisfactory starting materials for condensation with aldehydes to produce resins for use in the practice of the present invention, they may be advantageously incorporated with the alkylated phenols in substantial amounts to produce modified resins. Their incorporation in the starting material cheapens the procedure, and also lends flexibility, in that it provides one more variable for controlling the viscosity of the intermediate products and the solubility characteristics of the solid resin in the formations. Additions of 5 to 15 per cent of phenol or cresol to the tertiary para amyl phenol have been found to yield satisfactory resins for use in the practice of the present invention.

In operating under the present invention, the procedural steps will be identical with those described in Wrightsman's application Serial No. 419,900, filed November 21, 1941, and titled "Producing oil." First, water is circulated down the producing string until the annular space between the casing and the producing string and the latter itself are filled with water. Then the liquid resin produced at the surface and containing sufficient of the catalyst to promote its further condensation is introduced into the producing string and forced downwardly until it arrives at the formations in which it is to be injected. At this point the head of water over the liquid resin between the casing and the producing string is sealed off and pressure is applied to the fluid in the producing string thereby to force the resin into the desired formation. When the injection has been accomplished, the fluids are held under pressure until the resin has had time to harden to a point where it will not flow readily. Then the water in the producing string and in the casing is pumped out. The initial setting period may be easily determined in advance by observing the viscosity of the resin at various intervals at the formation temperature.

After the initial setting period the well is placed on production for a considerable period of time, from about five to twenty days, in order to insure that any resin which has become contaminated with oil and therefore has not set firmly is washed out of the formations. Thereafter production is stopped and the sequence of operations before recited is again performed. The period of production between stages may be varied as indicated, it being apparent, of course, that the greater the period allowed, the more complete will be the removal from the formations of contaminated resins. Thus, where time permits, production should be continued for fifteen days or even longer between the two stages of impregnation.

The amount of resin injected into the well will depend upon the thickness of the formation to be plugged, as well as the depth of penetration desired. Ordinarily, the resin should penetrate the formation to a depth of at least about a foot, although somewhat lower penetration is permissible where the formation has structural strength. Greater penetrations are naturally permissible, but add nothing to the effectiveness of the pumping operation.

In a practical operation in accordance with the present invention, the formations treated were two sand bodies, one of five feet and the other of six feet, separated by seven feet of sandy shale and twenty-six feet of shale. In the first stage of the treatment 10 bbls. of resin in the oily intermediate stage were pumped into the formation for an average penetration of 0.91 bbl. per foot of formation, which is equal to a radial distance of 2.4 ft. from the well bore. After a suitable period for the setting of the resin, the well was placed on production and produced a fluid of which 82 per cent was water.

The treatment was then repeated, using 8 bbls. of the oily resin intermediate, which was equivalent to 0.73 bbl. per foot of formation, or a penetration of 2.1 feet from the well bore, based on a 30 per cent porosity and a 6-inch well bore. As a result of the second treatment the well, when placed back on production, produced a fluid of which only 63 per cent was water.

The general volume required to plug the sand is based on a sand porosity of 30 per cent and a 6-inch well bore. Since the system is radial, the volume varies as the square of the distance from the center of the well bore. Tabulated below are the results in terms of bbls./ft. of sand thickness calculated according to the above assumptions. The total volume will be found by multiplying the factor by the sand thickness.

| Feet penetration | Bbls./ft. of sand thickness |
| --- | --- |
| 1 | 0.25 |
| 2 | 0.65 |
| 3 | 1.45 |
| 4 | 2.70 |
| 5 | 4.25 |
| 6 | 6.20 |
| 7 | 8.35 |
| 8 | 10.70 |

The nature and objects of the present invention having been thus described and illustrated, what is claimed as new and useful and is desired to be secured by Letters Patent is:

A method for selectively plugging formations producing oil and water traversed by a borehole to decrease the production of water therefrom, which comprises reacting a mixture of substances capable of condensing to form a solid resin soluble in oil and insoluble in water, to an intermediate oily stage, forcing the oily intermediate product into the formations to be treated, holding them in place until reaction is completed and the said solid resin is deposited in the formations, allowing the formations to produce for a period of time sufficient to wash out unsolidified resin and then repeating the above sequence of operations.

STUART E. BUCKLEY.
GILBERT G. WRIGHTSMAN.